(12) United States Patent
Yanagita et al.

(10) Patent No.: US 10,662,695 B2
(45) Date of Patent: May 26, 2020

(54) OPENING-CLOSING BODY CONTROL SYSTEM AND OPENING-CLOSING BODY CONTROL METHOD

(71) Applicant: MITSUBA Corporation, Gunma (JP)

(72) Inventors: Yuichi Yanagita, Gunma (JP); Masahiro Fueki, Gunma (JP); Toshihiro Ejima, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 0 days.

(21) Appl. No.: 16/097,981

(22) PCT Filed: May 10, 2017

(86) PCT No.: PCT/JP2017/017704
§ 371 (c)(1),
(2) Date: Oct. 31, 2018

(87) PCT Pub. No.: WO2017/203982
PCT Pub. Date: Nov. 30, 2017

(65) Prior Publication Data
US 2019/0145149 A1 May 16, 2019

(30) Foreign Application Priority Data
May 26, 2016 (JP) .................. 2016-104797

(51) Int. Cl.
*H02P 8/00* (2006.01)
*E05F 15/695* (2015.01)
(Continued)

(52) U.S. Cl.
CPC .............. *E05F 15/695* (2015.01); *B60J 1/17* (2013.01); *E05F 15/41* (2015.01); *E05F 15/689* (2015.01);
(Continued)

(58) Field of Classification Search
CPC ................................ E05F 15/695; E05F 15/41
(Continued)

(56) References Cited

U.S. PATENT DOCUMENTS

| 2005/0017667 A1 | 1/2005 | Yamamoto |
| 2005/0212473 A1 | 9/2005 | Yamamoto |
| 2015/0207437 A1 | 7/2015 | Nagler |

FOREIGN PATENT DOCUMENTS

| JP | 2005-54564 | 3/2005 |
| JP | 2005-220734 | 8/2005 |

(Continued)

OTHER PUBLICATIONS

International Search Report dated Jun. 13, 2017 in International (PCT) Application No. PCT/JP2017/017704.
(Continued)

*Primary Examiner* — Erick D Glass
(74) *Attorney, Agent, or Firm* — Wenderoth, Lind & Ponack, L.L.P.

(57) ABSTRACT

A control unit controls an electric motor based on position data on a window glass, and controls an opening-closing operation of the window glass. The control unit includes a reverse rotation detector which detects a reverse rotation operation of the window glass, a reverse rotation prevention controller which performs reverse rotation prevention processing of the electric motor when a reverse rotation is detected, and a position data correction unit which corrects position data on the window glass in an initial operation after occurrence of a reverse rotation operation. If a pulse signal associated with rotation of the electric motor is not input in an initial operation after the detection of the reverse rotation operation, the position data correction unit determines that the window glass has reached a top dead center position,
(Continued)

stops the motor, and corrects the position data with the position data at that time as an origin position.

9 Claims, 5 Drawing Sheets

(51) Int. Cl.
  *B60J 1/17*   (2006.01)
  *H02P 8/08*   (2006.01)
  *E05F 15/689*  (2015.01)
  *E05F 15/41*   (2015.01)
  *E05F 15/697*  (2015.01)
  *H02H 7/085*  (2006.01)

(52) U.S. Cl.
  CPC .............. *E05F 15/697* (2015.01); *H02P 8/08* (2013.01); *E05Y 2400/30* (2013.01); *E05Y 2900/55* (2013.01); *H02H 7/0851* (2013.01)

(58) Field of Classification Search
  USPC ......................................................... 318/696
  See application file for complete search history.

(56) References Cited

FOREIGN PATENT DOCUMENTS

| | | |
|---|---|---|
| JP | 2014-34831 | 2/2014 |
| JP | 2014-531885 | 11/2014 |

OTHER PUBLICATIONS

International Preliminary Report on Patentability dated Dec. 6, 2018 in corresponding International (PCT) Application No. PCT/JP2017/017704.

[Fig. 1]
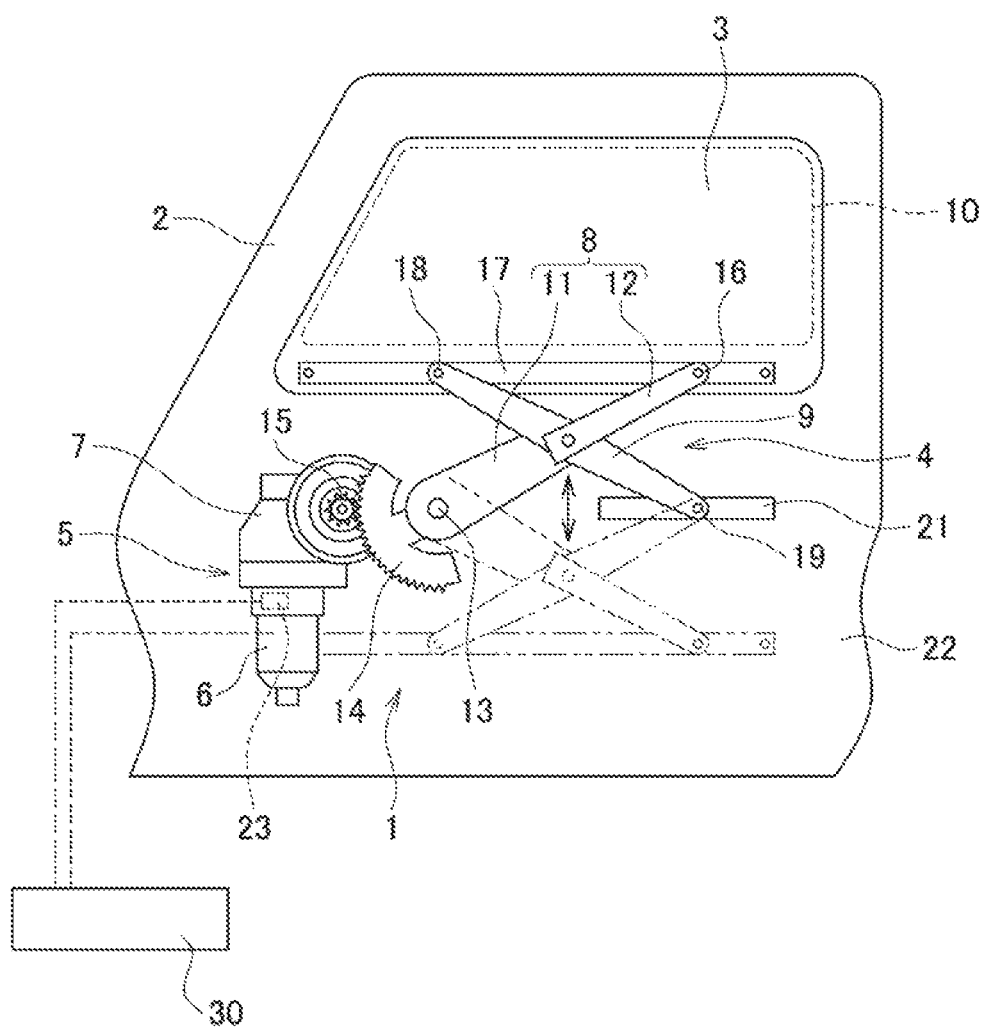

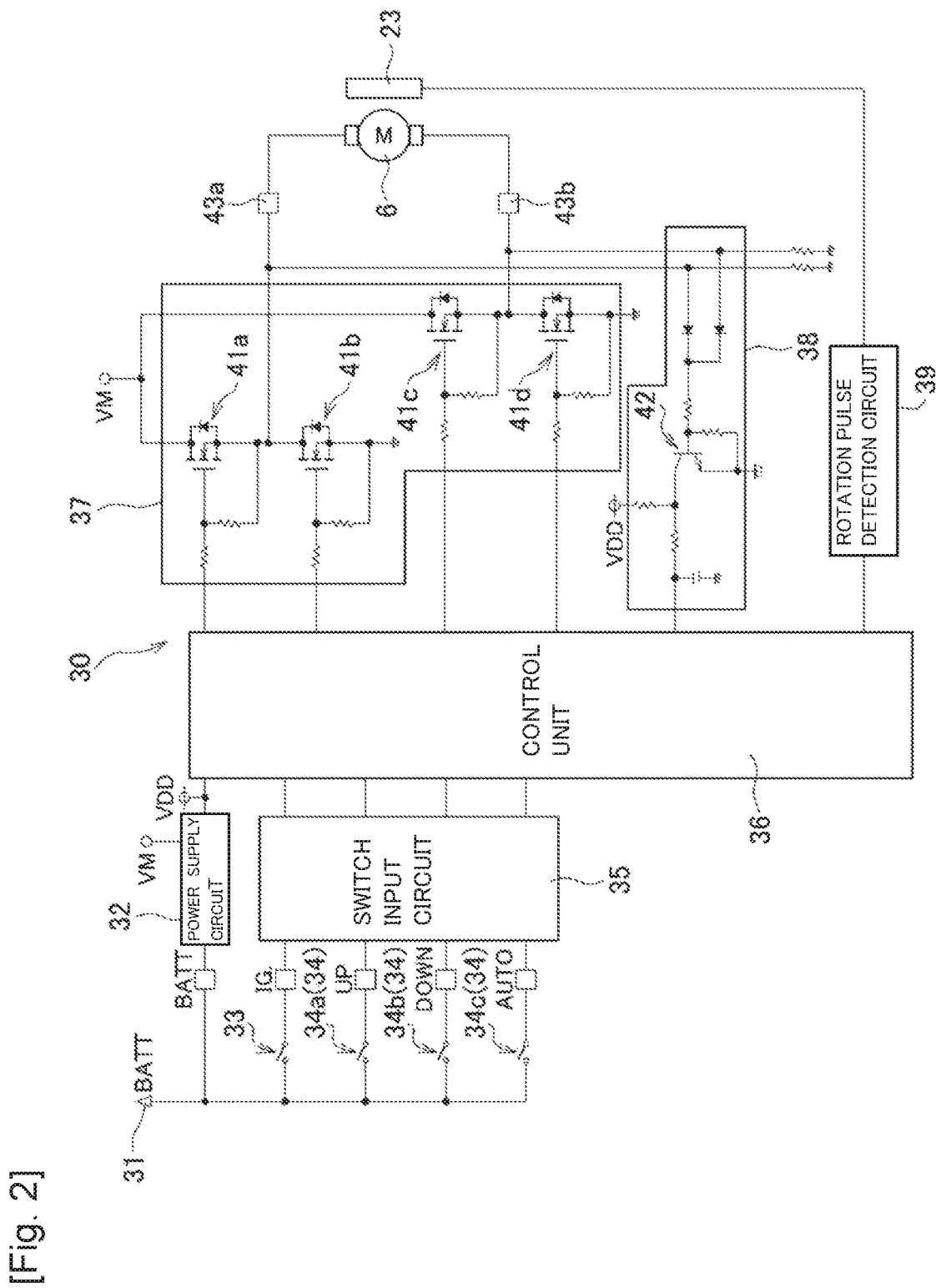
[Fig. 2]

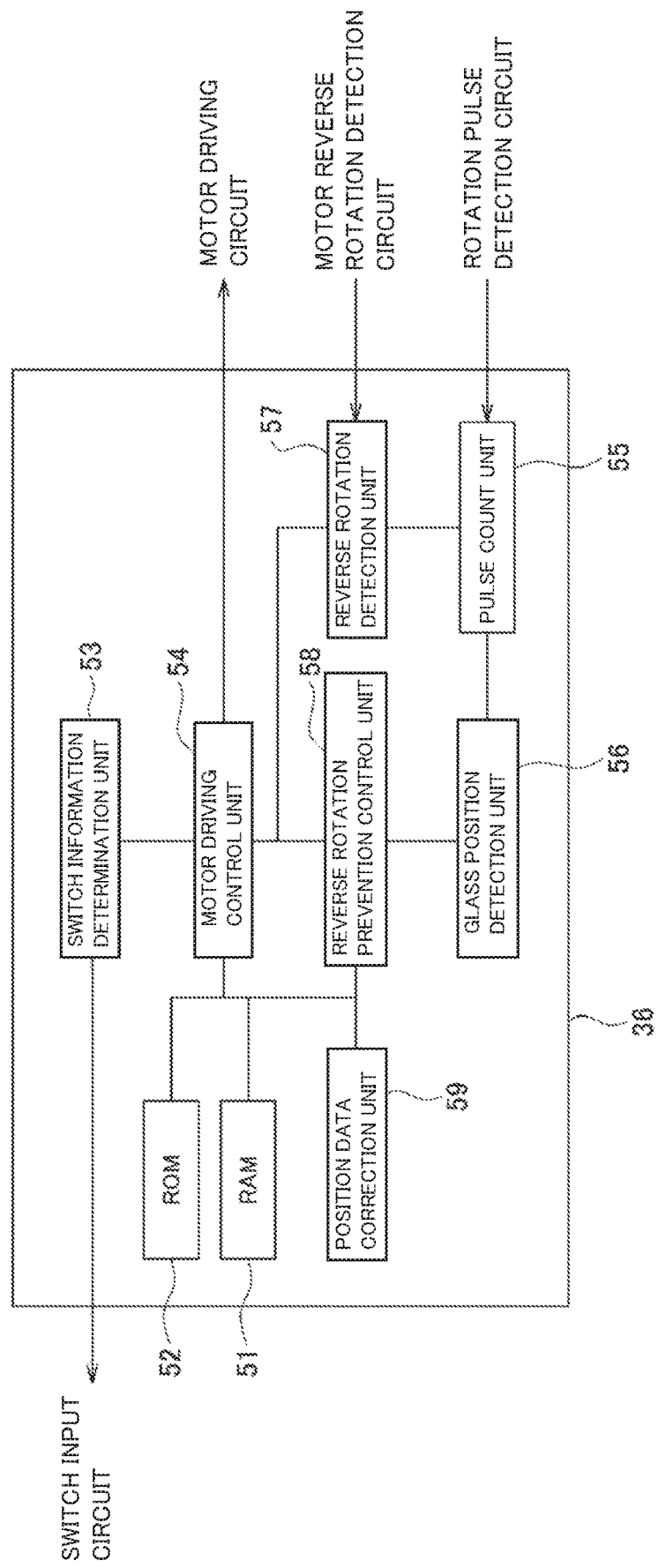
[Fig 3]

[Fig. 4]
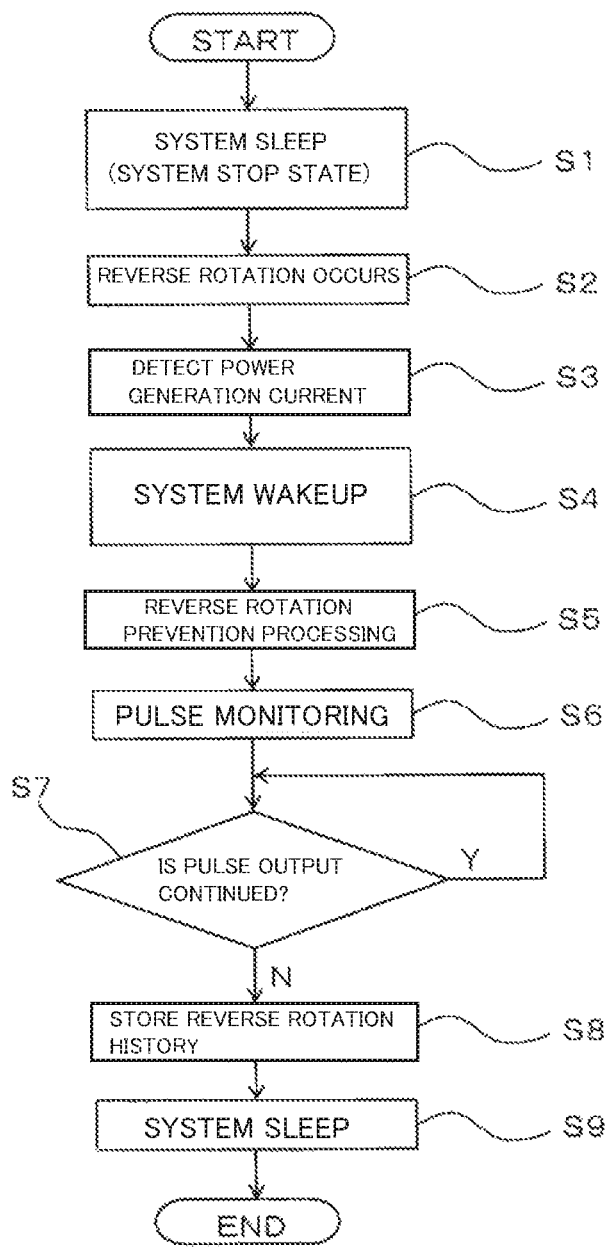

[Fig. 5]
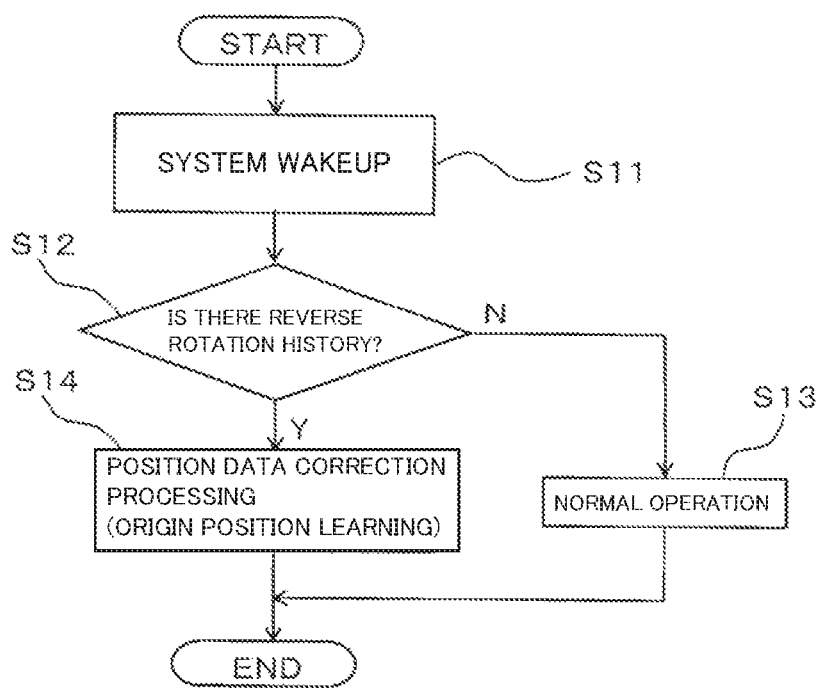

OPENING-CLOSING BODY CONTROL SYSTEM AND OPENING-CLOSING BODY CONTROL METHOD

TECHNICAL FIELD

The present invention relates to a control system of a vehicle opening-closing body such as a power window and a power slide door, and particularly to a position information correction technique of an opening-closing body in a case where the opening-closing body is reversely actuated.

BACKGROUND ART

A vehicle opening-closing body like a power window needs to be put under a brake device, or the window (opening-closing body) supposed to be stopped can move in an opening-closing direction. In other words, the opening-closing body even at rest can move against the intention of an operator, such as a driver, due to external force or its own weight. Both power supply terminals of the driving motor of the power window or the like are then conventionally short-circuited to form a closed loop and put a brake on the opening-closing body by counter electromotive force of the motor. An unintended opening-closing operation of the window or the like from the stopped position is prevented by the brake torque.

CITATION LIST

Patent Literature

Patent Literature 1: Japanese PCT National Publication No. 2014-531885

SUMMARY OF INVENTION

Problems to be Solved by the Invention

However, there has been a problem that even if a brake is applied to the opening-closing body, a discrepancy may occur between the actual position of the opening-closing body and position information for operation control once an opening-closing operation occurs. If the position information for control is different from the actual position of the opening-closing body, a closed position and the like are recognized differently. As a result, control such as nipping detection at the top dead center position of the power window can be interfered. For such a reason, the detection of an opening-closing operation unintended by the operator from the stopped position and the correction of the position information are both needed, and measures for effectively achieving these have been desired.

Means for Solving the Problems

An opening-closing body control system according to the present invention is an opening-closing body control system including: an opening-closing body that is arranged on an opening portion of a vehicle and opens and closes the opening portion; and a controller for actuating the opening-closing body based on position data on the opening portion, wherein the controller includes an opening-closing detection unit that, when an opening-closing operation in which the opening-closing body moves in an opening-closing direction occurs in a system stop state, detects the opening-closing operation, and a position data correction unit that, if the opening-closing detection unit detects the opening-closing operation of the opening-closing body, learns an origin position of the opening-closing body and corrects the position data on the opening-closing body in an initial operation after detection of the opening-closing operation.

According to the present invention, if there is a history of an unintended opening-closing operation of the opening-closing body due to external force and the like, the position data correction unit learns the origin position of the opening-closing body again and corrects the position data on the opening-closing body to the current value in the initial operation after the opening-closing movement. This can prevent a discrepancy between the actual position of the opening-closing body and the position information for operation control even if an opening-closing operation unintended by the operator occurs. Therefore, false recognition of a closed position and the like due to an unintended opening-closing operation can be prevented and, hence, control such as nipping detection at a top dead center position is normally performed.

The opening-closing body control system may further include a sensor that outputs a pulse signal according to an operation of the opening-closing body. When the pulse signal is not input for a certain period of time in the initial operation of the opening-closing body, the position data correction unit may stop the opening-closing body and correct the position data with the position data at that point in time as the origin position.

In the initial operation of the opening-closing body, the position data correction unit may repeat an operation of actuating the opening-closing body for a certain period of time and then stopping the opening-closing body. In such a case, the position data correction unit, in the initial operation of the opening-closing body, may actuate the opening-closing body by a normal operation until the position data on the opening-closing body coincides with position data on an old origin position, and repeat the operation of actuating the opening-closing body for a certain period of time and then stopping the opening-closing body after the opening-closing body reaches the old origin position, the old origin position being the origin position before the detection of the opening-closing operation.

The opening-closing body control system may have a nipping detection function of, if a load of certain level or higher acts during a closing operation of the opening-closing body, determining that nipping occurs and causing the opening-closing body to operate reversely, and have a detection mask region immediately before a fully-closed position of the opening-closing body, the nipping detection not being performed in the detection mask region. In the initial operation of the opening-closing body, the position data correction unit may actuate the opening-closing body by a normal operation until the position data on the opening-closing body coincides with position data on an old detection mask region, and repeat the operation of actuating the opening-closing body for a certain period of time and then stopping the opening-closing body after the opening-closing body reaches the old detection mask region, the old detection mask region being the detection mask region before the detection of the opening-closing operation.

In the initial operation of the opening-closing body, the position data correction unit may operate the opening-closing body at a lower speed than in a normal operation. In such a case, the position data correction unit, in the initial operation of the opening-closing body, may actuate the opening-closing body by the normal operation until the position data on the opening-closing body coincides with position data on an old origin position, and operate the opening-closing body at the lower speed than in the normal operation after the opening-closing body reaches the old origin position, the old origin position being the origin position before the detection of the opening-closing operation.

The opening-closing body control system may have a nipping detection function of, if a load of certain level or higher acts during a closing operation of the opening-closing body, determining that nipping occurs and causing the opening-closing body to operate reversely, and have a detection mask region immediately before a fully-closed position of the opening-closing body, the nipping detection not being performed in the detection mask region. In the initial operation of the opening-closing body, the position data correction unit may actuate the opening-closing body by the normal operation until the position data on the opening-closing body coincides with position data on an old detection mask region, and operate the opening-closing body at the lower speed than in the normal operation after the opening-closing body reaches the old detection mask region, the old detection mask region being the detection mask region before the detection of the opening-closing operation.

In the opening-closing body control system, the opening-closing body may be a window glass arranged on a window opening portion formed in a side surface of a vehicle. The controller may perform the origin learning operation when an opening operation in which the window glass moves in an opening direction occurs in the system stop state.

On the other hand, an opening-closing body control method according to the present invention is an operation control method of an opening-closing body arranged on an opening portion of a vehicle, the operation control method including, when an opening-closing operation in which the opening-closing body moves in an opening-closing direction occurs in a system stop state, learning an origin position of the opening-closing body and correcting position data on the opening-closing body in an initial operation after the opening-closing operation.

According to the present invention, if there is a history of an unintended opening-closing operation of the opening-closing body due to external force and the like, the origin position of the opening-closing body is learned again and the position data on the opening-closing body is corrected to the current value in the initial operation after the opening-closing movement. This can prevent a discrepancy between the actual position of the opening-closing body and the position information for operation control even if an unintended opening-closing operation occurs. Therefore, false recognition of a closed position and the like due to an unintended opening-closing operation can be prevented and, hence, control such as nipping detection at a top dead center position is normally performed.

Advantageous Effects of the Invention

According to the opening-closing body control system of the present invention, there is provided the position data correction unit that, if an unintended opening-closing operation of the opening-closing body is detected, learns the origin position of the opening-closing body and corrects the position data on the opening-closing body in the initial operation after the detection of the opening-closing operation. If there is a history of an unintended opening-closing operation of the opening-closing body due to external force and the like, the origin position of the opening-closing body is therefore learned again and the position data on the opening-closing body is corrected to the current value in the initial operation after the opening-closing movement. This can prevent a discrepancy between the actual position of the opening-closing body and the position information for operation control even if an unintended opening-closing operation occurs.

BRIEF DESCRIPTION OF THE DRAWINGS

FIG. 1 is an explanatory diagram showing a configuration of a power window apparatus to which an opening-closing body control system and control method that are embodiment 1 of the present invention are applied.

FIG. 2 is a block diagram showing an entire configuration of the opening-closing body control system that is embodiment 1 of the present invention.

FIG. 3 is a block diagram showing a configuration of a control system of a control unit.

FIG. 4 is a flowchart showing a flow of control processing of the power window apparatus of FIG. 1 when a reverse rotation is detected.

FIG. 5 is a flowchart showing a flow of position data correction processing after reverse rotation prevention processing.

MODE FOR CARRYING OUT THE INVENTION (Embodiment 1)

An embodiment of the present invention will be described in detail below with reference to the drawings. The object of the following embodiment is to provide a control system and control method of an opening-closing body which, if a vehicle opening-closing body undergoes an opening-closing operation unintended by an operator from a stop position, can accurately correct position information about the opening-closing body after the opening-closing operation.

FIG. 1 is an explanatory diagram showing a configuration of a power window apparatus 1 to which an opening-closing body control system and control method that are Embodiment 1 of the present invention are applied. As shown in FIG. 1, a window opening portion 10 is formed in a door 2 provided on a side surface of a vehicle. A window glass 3 which is an opening-closing body is attached to the window opening portion 10. The power window apparatus 1 for vertically lifting up and down the window glass 3 is mounted on the door 2. The power window apparatus 1 includes a window regulator 4 which lifts up and down the window glass 3, and a power window motor 5 which drives the window regulator 4. The window regulator 4 is a window regulator of so-called X-arm type.

The power window motor 5 is a motor with a reduction mechanism, and includes an electric motor 6 and a gear unit 7 including the reduction mechanism. The electric motor 6 is driven and controlled by a motor control device 30. The rotation of the electric motor 6 is reduced in speed by the gear unit 7 and transmitted to the window regulator 4. The window regulator 4 includes a main arm 8 which is rotated by the power window motor 5, and a sub arm 9 which is rotatably connected to the main arm 8. The main arm 8 is composed of a driving arm 11 and a driven arm 12.

The bottom end portion (end portion on the power window motor 5 side) of the driving arm 11 is rotatably supported by a rotary shaft 13. A sector gear 14 is fixed to the bottom end portion of the driving arm 11. The sector gear 14 meshes with a pinion gear 15 of the power window motor 5. If the power window motor 5 is activated to rotate the pinion gear 15, the driving arm 11 rotates about the rotary shaft 13 with the sector gear 14.

The top end portion of the driving arm 11 is connected to the bottom end portion of the driven arm 12. A slider 16 is rotatably mounted on the top end portion of the driven arm 12. The slider 16 is slidably attached to a rail 17. The rail 17 is attached to a lower end portion of the window glass 3.

The sub arm 9 intersects with the main arm 8. The center portion of the sub arm 9 is rotatably connected to the main arm 8 at the joint portion between the driving arm 11 and the driven arm 12. A slider 18 is rotatably mounted on the top end portion (in the diagram, left end portion) of the sub arm 9. The slider 18 is slidably attached to the rail 17. A slider 19 is rotatably mounted on the bottom end portion (in the diagram, right end portion) of the sub arm 9. The slider 19 is slidably attached to a rail 21. The rail 21 is fixed to a door panel 22. As the main arm 8 rotates about the rotary shaft 13, the sub arm 9 rotates about its bottom end portion accordingly.

The main arm 8 and the sub arm 9 are attached to the side of the door panel 22 at the bottom end portions, and to the window glass 3 at the top end portions. The window glass 3 is supported by the pair of arms 8 and 9 in a liftable manner with respect to the door panel 22. If the power window motor 5 is activated, the driving arm 11 rotates about the rotary shaft 13. The driven arm 12 then also rotates about the rotary shaft 13 with the driving arm 11, and the slider 16 slides and moves horizontally along the rail 17. The window glass 3 then moves vertically up or down along a not-shown guide fixed to the door panel 22.

If the window glass 3 moves up or down, the sub arm 9 rotates about its bottom end portion in a direction reverse to the rotation direction of the main arm 8. As the sub arm 9 rotates, the sliders 18 and 19 slide along the rails 17 and 21. The window glass 3 is thereby vertically lifted up or down with the rail 17 maintained horizontal, and the window glass 3 is opened or closed by the power window apparatus 1.

In such a power window apparatus 1, if an unintended opening operation (reverse rotation operation) of lowering the window glass 3 occurs due to external force and the like, the motor control apparatus 30 detects and stores the opening-closing operation (occurrence of reverse rotation) as a history (storage of reverse rotation history). As described above, the occurrence of a reverse rotation operation may cause a discrepancy between the actual position of the opening-closing body and position information for operation control. The control system according to the present invention then performs an origin learning operation for data correction in the initial operation after the opening-closing movement (reverse rotation) in order that the actual position of the opening-closing body and the position information for operation control coincide with each other.

FIG. 2 is a block diagram showing an overall configuration of the opening-closing body control system. As shown in FIG. 2, the control system according to the present invention includes the motor control device 30, a power supply circuit 32 connected with a battery 31, and a switch input circuit 35 connected with an ignition switch 33 and power window switches 34. The power window switches 34 include an up switch 34a (UP), a down switch 34b (DOWN), and an automatic switch 34c (AUTO) of the window glass 3. The automatic switch 34c continuously actuates the window glass 3 up to a top dead center or a bottom dead center by a single operation.

The motor control device 30 includes a control unit (CPU) 36, a motor driving circuit 37, a motor reverse rotation detection circuit 38, and a rotation pulse detection circuit 39.

The motor driving circuit 37 rotates the electric motor 6 forward and reverse based on commands of the control unit 36. The motor reverse rotation detection circuit 38 detects a reverse rotation operation of the electric motor 6. The electric motor 6 includes a rotation sensor 23 such as a Hall element. As the electric motor 6 rotates, the rotation sensor 23 outputs a pulse signal which is input to the rotation pulse detection circuit 39. The rotation pulse detection circuit 39 detects and transmits the pulse signal from the rotation sensor 23 to the control unit 36. The control unit 36 recognizes the position of the window glass 3 by counting the pulse signal input to the rotation pulse detection circuit 39.

As shown in FIG. 2, the motor control circuit 37 includes a bridge circuit of FETs 41a to 41d. The FETs 41a to 41d are turned on/off by the control unit 36. If the FETs 41a and 41d are turned on, the electric motor 6 rotates in a forward direction and the window glass 3 moves up. If the FETs 41b and 41c are turned on, the electric motor 6 rotates in a reverse direction and the window glass 3 moves down.

The motor reverse rotation detection circuit 38 includes a transistor 42. If a reverse rotation operation occurs on the window glass 3, the power window motor 5 is rotated from the pinion gear 15 side and a power generation action occurs in the electric motor 6. Electromotive force occurring in the electric motor 6 turns on the transistor 42. The motor reverse rotation detection circuit 38 converts an analog voltage occurring between motor terminals 43a and 43b into an on/off signal via the transistor 42. The on/off signal is input to the control unit 36 as a reverse rotation detection signal.

FIG. 3 is a block diagram showing a configuration of a control system of the control unit 36. As shown in FIG. 3, the control unit 36 includes, along with a RAM 51 and ROM 52, a switch information determination unit 53 which is connected to the switch input circuit 35, and a motor driving control unit 54 which controls an operation of the electric motor 6. The motor driving control unit 54 controls the operation of the motor 6 based on switch information found out by the switch information determination unit 53. The RAM 51 temporarily stores various types of data and the like during a control operation. The ROM 52 stores a control program, reference values, etc. The control unit 36 includes a pulse count unit 55 and a glass position detection unit 56. The pulse count unit 55 counts the pulse signal input to the rotation pulse detection circuit 39. The glass position detection unit 56 detects the position of the window glass 3 based on the number of counts of the pulse signal.

The number of counts of the pulse signal from the rotation sensor 23 has a predetermined relationship with the position of the window glass 3. The glass position detection unit 56 receiving the pulse count value calculates the current position of the window glass 3 from the pulse count value. The power window apparatus 1 stores pulse values at respective positions as position data in the ROM 52, with a state where the window glass 3 is at the top dead center position (fully-closed position) as a point of origin. The glass position detection unit 56 refers to the ROM 52 and obtains current position information about the window glass 3 based on the pulse count value obtained from the pulse count unit 55.

The motor driving control unit 54 determines an operation direction and operation speed of the electric motor 6 based on the switch information and the current position information about the window glass 3, and transmits a control signal to the motor driving circuit 37. Based on the control signal, the motor driving circuit 37 turns on/off the FETs 41a to 41d as appropriate, whereby the electric motor 6 is driven in a predetermined direction.

The control unit 36 further includes a reverse rotation detection unit 57 serving as an opening-closing detection unit, and a reverse rotation prevention control unit 58. The reverse rotation detection unit 57 receives the reverse rotation detection signal from the motor reverse rotation detection circuit 38, and detects a reverse rotation operation of the window glass 3. If a reverse rotation operation is detected by the reverse rotation detection unit 57, the reverse rotation prevention control unit 58 performs reverse rotation prevention processing on the electric motor 6. If the occurrence of a reverse rotation is detected, the reverse rotation prevention control unit 58 also performs motor reverse rotation prevention processing and stores the occurrence of the reverse rotation into the RAM 51 as a "reverse rotation history". A position data correction unit 59 is further provided at a subsequent stage of the reverse rotation detection unit 57. The position data correction unit 59 corrects the position data on the window glass 3 in the initial operation after the occurrence of a reverse rotation operation.

FIG. 4 is a flowchart showing a flow of control processing of the power window apparatus 1 when a reverse rotation is detected. As shown in FIG. 4, if a reverse rotation operation occurs (step S2) from a system stop state (step S1), the power window motor 5 is rotated accordingly from the pinion gear 15 side, and a power generation action occurs in the motor. Electromotive force occurring in the electric motor 6 turns on the transistor 42 of the motor reverse rotation detection circuit 38, and the reverse rotation detection signal is output from the motor reverse rotation detection circuit 38 to the control unit 36 (step S3: detect power generation current). Receiving the interrupt by the reverse rotation detection signal, the control unit 36 wakes up the system (step S4). The reverse rotation prevention control unit 58 performs the reverse rotation prevention processing (step S5).

In the reverse rotation prevention processing, the FETs 41b and 41d on the lower stage side of the motor driving circuit 37 are turned on to put a brake on the electric motor 6. Here, the reverse rotation prevention control unit 58 of the control unit 36 commands the motor driving control unit 54 the reverse rotation prevention processing to turn on the FETs 41b and 41d. The reverse rotation prevention control unit 58 then acts on the pulse count unit 55 to check the input status of the pulse signal (step S6), and continues pulse monitoring while the input of the pulse signal is continued (step S7). If the brake works and the input of the pulse signal stops, the reverse rotation prevention control unit 58 stores the occurrence of the reverse rotation operation into the RAM 51 as a "reverse rotation history" (step S8), and puts the system to sleep (step S9).

As described above, the power window apparatus 1 is not configured to maintain the lower-stage switching elements (FETs) constantly on, but to detect a reverse rotation of the electric motor 6 from the power generation current thereof and perform brake control after the detection of the reverse rotation. This eliminates the need to apply a control voltage to the switching elements during parking and stopping, etc. The current consumption (dark current) can thus be reduced to suppress battery consumption and drainage.

On the other hand, if the reverse rotation detection and the reverse rotation prevention processing are performed by the processing of FIG. 4 and the electric motor 6 is rotated reversely during a period between the system wakeup and the braking, the actual position of the window glass 3 and the position information for operation control can deviate accordingly. More specifically, the pulse count value can deviate from the current position as much as the amount of reverse rotation of the electric motor 6 (as much as the amount of lowering of the window glass 3). The control system according to the present invention then performs correction processing of pulse data if there is a past "reverse rotation history" when the system is woken up next time by an operation of the power window switches 34 and the like.

FIG. 5 is a flowchart showing a flow of the position data correction processing after the reverse rotation prevention processing. As shown in FIG. 5, if the system wakes up (step S11), the presence or absence of a "reverse rotation history" is initially checked (step S12). If there is no "reverse rotation history", the processing proceeds to step S13, and a normal operation is performed to exit the routine. On the other hand, if there is a "reverse rotation history", the processing proceeds to step S14, and the correction processing of the position data (initial operation) is performed before exiting the routine.

In such a case, the correction processing of the position data is performed in the following manner. The correction processing is performed in the initial operation after the detection of the reverse rotation operation, regardless of which position the window glass 3 is at. Here, the AUTO operation is disabled, and the window glass 3 is actuated up to the top dead center position by only manual operations. The pulse data is then corrected by the following procedure (inching mode).

(1) If the up switch 34a is turned on in the initial operation after the reverse rotation, the position data correction unit 59 acts on the motor driving control unit 54 to activate the electric motor 6 for a certain period of time (for example, 0.5 seconds) and then stop the electric motor 6 (inching stop). Here, the electric motor 6 is stopped after the certain time even if the up switch 34a is on. The up operation of the window glass 3 therefore appears to the operator to stop soon even if the switch is on.

(2) If the up switch 34a is turned off once and the up switch 34a is turned on again, the motor driving control unit 54 activates the electric motor 6 for a certain period of time and then stops the electric motor 6 just like before. That is, if the operator turns off the switch once and turns on the switch again because the window glass 3 stops soon despite the switch-on, the window glass 3 moves up a little and stops again.

(3) If such an inching operation is repeated and the window glass 3 has reached the top dead center, the electric motor 6 enters a locked state and stops. If the electric motor 6 is locked, the pulse signal from the rotation pulse detection circuit 39 is no longer input to the pulse count unit 55. If the input of the pulse signal stops, the position data correction unit 59 determines that the top dead center is reached, and stops the electric motor 6.

(4) After stopping the electric motor 6, the position data correction unit 59 determines that the current position of the window glass 3 is the top dead center position (fully-closed position of the window), and stores the pulse data at that time into the ROM 52 as origin position data.

(5) After the position data on the window glass 3 is rewritten, the system enters a normal operation. More specifically, the control unit 36 drives and controls the electric motor 6 based on switch information and position data.

As described above, if there is a history of unintended opening or closing actuation of the window glass (opening-closing body) 3 due to external force and the like, the opening-closing body control system according to the present invention repeats the inching up operation in the initial operation after the opening-closing movement until the window glass 3 reaches the top dead center position. When the window glass 3 has reached the top dead center position, the pulse count value at that time is stored as the origin position data. Even if an opening-closing operation unintended by the operator occurs, the position data on the window glass 3 is thus corrected by the subsequent initial operation. This can prevent a discrepancy between the actual position of the opening-closing body and the position information for operation control. As a result, false recognition of a closed position and the like due to an unintended opening-closing operation can be prevented and, hence, control such as nipping detection at a top dead center position is normally performed.

(Embodiment 2)

Next, an opening-closing body control system that is Embodiment 2 of the present invention will be described. In the following embodiments, the system configuration of FIGS. 1 to 5 is the same as that of the foregoing embodiment 1. A difference lies in the mode in which the position data correction processing is performed in step S5 of FIG. 5.

Here, the position data is corrected in the following procedure (slow up mode). The correction processing according to embodiment 2 is also performed regardless of which position the window glass 3 is at, whereas the AUTO operation is not disabled.

(1) If the up switch 34*a* is turned on in the initial operation after a reverse rotation, the position data correction unit 59 causes the electric motor 6 to make an AUTO operation at low speed (slow-up operation) regardless of the switch state. Here, the window glass 3 operates slowly at a speed of about 50% that in a normal operation.

(2) If the window glass 3 has reached the top dead center by the slow operation, the electric motor 6 enters a locked state and stops. As in embodiment 1, the position data correction unit 59 determines from the discontinuance of the pulse signal that the top dead center is reached, and stops the electric motor 6. The pulse data at that time is stored into the ROM 52 as the origin position data. The system then enters a normal operation.

(Embodiment 3)

An opening-closing body control system that is embodiment 3 of the present invention will be described. Here, the window glass 3 is normally operated up to an old top dead center origin position. If the window glass 3 moves up beyond the old top dead center origin position, the control (data correction processing) of the foregoing embodiment 1 or 2 is then performed.

In this case, if the window is in a fully-closed state before the reverse rotation operation, the position data on the window glass 3 is that of the top dead center origin position. If the window glass 3 lowers in such a state, the position data remains to be that of the "top dead center origin position" and only the glass comes down. It follows that the position that the control unit 36 recognizes to be the "top dead center origin position" moves down. Then, in Embodiment 3, the window glass 3 is initially actuated by a normal operation up to the old top dead center origin position (old origin position) which the control unit 36 erroneously recognizes to be the "top dead center origin position". The control of Embodiment 1 or 2 is then performed to correct the position data above the old top dead center origin position where there is no position data. The correction processing can thereby be performed quickly, compared to the case where the inching mode or slow-up mode is applied over the entire operation region.

(Embodiment 4)

The window glass 3 may be normally operated up to an old nipping detection mask position, instead of the old top dead center origin position according to Embodiment 3 of the present invention. If the window glass 3 moves up beyond the old nipping detection mask position, the control (data correction control) of the foregoing Embodiment 1 or 2 may be performed.

In general, the power window is provided with an insensitive region of nipping detection, called "detection mask region", immediately before the top dead center. The power window usually has a function of determining the occurrence of nipping and causing the window to operate reversely if a load of certain level or higher is applied. Meanwhile, a seal member is arranged on the top edge of the window. If the window comes into contact with the seal member, the load may be erroneously detected as nipping. For such a reason, a "detection mask region" where an increase in load is not determined to be the occurrence of nipping and the window is not reversely operated is provided for the power window immediately before the top dead center, in the vicinity of the top dead center (approximately 4 mm or so to avoid nipping a child's fingers).

If, as in Embodiment 3, the window is in a fully-closed state before a reverse rotation operation, the position data on the "detection mask region" about the window glass 3 is the data of the original position near the top dead center origin point. If the window glass 3 lowers in that state, the position data on the detection mask remains the same and only the glass comes down. It follows, again, that the position that the control unit 36 recognizes to be the "detection mask region" moves down. Then, in Embodiment 4, the window glass 3 is initially actuated by a normal operation up to the old nipping detection mask region which the control unit 36 erroneously recognizes to be the "detection mask region". After the old detection mask region is reached, the control of Embodiment 1 or 2 is then performed to correct the position data. The correction processing of the position data can thus be performed while securing the "detection mask region". Even in such a case, the correction processing can be performed quickly, compared to the case where the inching mode or slow-up mode is applied over the entire operation region.

It will be understood that the present invention is not limited to the foregoing embodiments, and various modifications may be made without departing from the gist thereof.

For example, in the foregoing embodiments, a side window glass of an automobile has been described as an example of the opening-closing body to which the control system according to the present invention is applied. However, applications are not limited to a side window, and the control system according to the present invention may be applied to opening-closing bodies such as a slide door, a sunroof, and a power tailgate of an automobile. In such cases, the top dead center according to the foregoing embodiments corresponds to the fully-closed positions of the opening-closing bodies in the respective apparatuses. The foregoing embodiments deal with an example of control in which the origin learning operation for data correction is performed in the event of an opening operation such that the window glass 3 serving as the opening-closing body comes down due to external force and the like. However, the present invention may be applied to a control when a closing operation of the opening-closing body occurs due to external force and the like. In the foregoing embodiments, an arm type apparatus which moves the window glass up and down by using a link mechanism is described as the power window apparatus using the control system according to the present invention. However, the present invention may be applied to a wire type power window apparatus which moves the window glass up and down by using wires.

INDUSTRIAL APPLICABILITY

The opening-closing body control system according to the present invention may be applied not only to a side window glass of an automobile, but also to opening-closing bodies such as a power window, a slide door, a sunroof, and a power tailgate mounted on industrial apparatuses and other vehicles in general.

EXPLANATION OF REFERENCE SYMBOLS

1: power window apparatus
2: door
3: window glass
4: window regulator
5: power window motor
6: electric motor
7: gear unit
8: main arm
9: sub arm
10: window opening portion
11: driving arm
12: driven arm
13: rotary shaft
14: sector gear
15: pinion gear
16: slider
17: rail
18: slider
19: slider
21: rail
22: door panel
23: rotation sensor
30: motor control device
31: battery
32: power supply circuit
33: ignition switch
34: power window switch
34a: up switch
34b: down switch
34c: automatic switch
35: switch input circuit
36: control unit
37: motor driving circuit
38: motor reverse rotation detection circuit
39: rotation pulse detection circuit
41a to 41d: FET
42: transistor
43a, 43a: motor terminal
51: RAM
52: ROM
53: switch information determination unit
54: motor driving control unit
55: pulse count unit
56: glass position detection unit
57: reverse rotation detection unit
58: reverse rotation prevention control unit
59: position data correction unit

The invention claimed is:
1. An opening-closing body control system comprising:
   an opening-closing body that is arranged on an opening portion of a vehicle and opens and closes the opening portion;
   a controller for actuating the opening-closing body based on position data of the opening-closing body; and
   a switch for performing a switch operation of switching opening-closing operation of the opening-closing body, wherein
   the controller includes
   an opening-closing detection unit that, when an opening-closing operation in which the opening-closing body moves in an opening-closing direction occurs in an opening-closing body control system stop state, detects the opening-closing operation, and
   a position data correction unit that, if the opening-closing detection unit detects the opening-closing operation of the opening-closing body, corrects the position data of the opening-closing body and learns an origin position of the opening-closing body again in an initial operation as the switch operation after detection of the opening-closing operation,
   in the initial operation of the opening-closing body, the position data correction unit actuates the opening-closing body by a normal operation until the position data of the opening-closing body coincides with position data of an old origin position, and repeats the operation of actuating the opening-closing body for a certain period of time and then stops the opening-closing body after the opening-closing body reaches the old origin position, the old origin position being the origin position before the detection of the opening-closing operation.

2. The opening-closing body control system according to claim 1, further comprising a sensor that outputs a pulse signal according to an operation of the opening-closing body, wherein
   when the pulse signal is not input for a certain period of time in the initial operation of the opening-closing body, the position data correction unit stops the opening-closing body and corrects the position data with the position data at that point in time as the origin position.

3. The opening-closing body control system according to claim 1, wherein:
   the opening-closing body is a window glass arranged on a window opening portion formed in a side surface of a vehicle; and
   the controller performs the origin learning operation when an opening operation in which the window glass moves in an opening direction occurs in the system stop state.

4. An opening-closing body control system comprising:
   an opening-closing body that is arranged on an opening portion of a vehicle and opens and closes the opening portion;
   a controller for actuating the opening-closing body based on position data of the opening-closing body; and
   a switch for performing a switch operation of switching opening-closing operation of the opening-closing body, wherein
   the controller includes
   an opening-closing detection unit that, when an opening-closing operation in which the opening-closing body moves in an opening-closing direction occurs in an opening-closing body control system stop state, detects the opening-closing operation, and
   a position data correction unit that, if the opening-closing detection unit detects the opening-closing operation of the opening-closing body, corrects the position data of the opening-closing body and learns an origin position of the opening-closing body again in an initial operation as the switch operation after detection of the opening-closing operation, the opening-closing body control system has a function of, if a load of certain level or higher acts during a closing operation of the opening-closing body, causing the opening-closing body to operate reversely, and has a detection mask region immediately before a fully-closed position of the opening-closing body, the reverse operation not being performed in the detection mask region; and in the initial operation of the opening-closing body, the position data correction unit actuates the opening-closing body by a normal operation until the position data of the opening-closing body coincides with position data of an old detection mask region, and repeats the operation of actuating the opening-closing body for a certain period of time and then stops the opening-closing body after the opening-closing body reaches the old detection mask region, the old detection mask region being the detection mask region before the detection of the opening-closing operation.

5. The opening-closing body control system according to claim 4, further comprising a sensor that outputs a pulse signal according to an operation of the opening-closing body, wherein when the pulse signal is not input for a certain period of time in the initial operation of the opening-closing body, the position data correction unit stops the opening-closing body and corrects the position data with the position data at that point in time as the origin position.

6. The opening-closing body control system according to claim 4, wherein:

the opening-closing body is a window glass arranged on a window opening portion formed in a side surface of a vehicle; and the controller performs the origin learning operation when an opening operation in which the window glass moves in an opening direction occurs in the system stop state.

7. An opening-closing body control system comprising:

an opening-closing body that is arranged on an opening portion of a vehicle and opens and closes the opening portion;

a controller for actuating the opening-closing body based on position data of the opening-closing body; and a switch for performing a switch operation of switching opening-closing operation of the opening-closing body, wherein the controller includes an opening-closing detection unit that, when an opening-closing operation in which the opening-closing body moves in an opening-closing direction occurs in an opening-closing body control system stop state, detects the opening-closing operation, and a position data correction unit that, if the opening-closing detection unit detects the opening-closing operation of the opening-closing body, corrects the position data of the opening-closing body and learns an origin position of the opening-closing body again in an initial operation as the switch operation after detection of the opening-closing operation, the opening-closing body control system has a function of, if a load of certain level or higher acts during a closing operation of the opening-closing body, causing the opening-closing body to operate reversely, and has a detection mask region immediately before a fully-closed position of the opening-closing body, the reverse operation not being performed in the detection mask region; and in the initial operation of the opening-closing body, the position data correction unit actuates the opening-closing body by the normal operation until the position data of the opening-closing body coincides with position data of an old detection mask region, and operates the opening-closing body at the lower speed than in the normal operation after the opening-closing body reaches the old detection mask region, the old detection mask region being the detection mask region before the detection of the opening-closing operation.

8. The opening-closing body control system according to claim 7, further comprising a sensor that outputs a pulse signal according to an operation of the opening-closing body, wherein when the pulse signal is not input for a certain period of time in the initial operation of the opening-closing body, the position data correction unit stops the opening-closing body and corrects the position data with the position data at that point in time as the origin position.

9. The opening-closing body control system according to claim 7, wherein:

the opening-closing body is a window glass arranged on a window opening portion formed in a side surface of a vehicle; and the controller performs the origin learning operation when an opening operation in which the window glass moves in an opening direction occurs in the system stop state.

* * * * *